United States Patent [19]

Maher

[11] Patent Number: 4,706,163
[45] Date of Patent: Nov. 10, 1987

[54] CAPACITOR WITH DIELECTRIC OF PLZT AND AN INTERGRANULAR BORATE

[75] Inventor: Galeb H. Maher, North Adams, Mass.

[73] Assignee: Sprague Electric Company, North Adams, Mass.

[21] Appl. No.: 18,635

[22] Filed: Feb. 25, 1987

[51] Int. Cl.⁴ .................. H01G 4/12; C04B 35/46
[52] U.S. Cl. ............................. 361/321; 264/61
[58] Field of Search ................ 501/134–138; 264/61; 252/62.3; 29/25.42; 361/320–322, 328–330

[56] References Cited

U.S. PATENT DOCUMENTS

| | | | |
|---|---|---|---|
| 3,558,332 | 1/1971 | Buchanan et al. | 264/61 X |
| 3,704,266 | 11/1972 | Ueoka et al. | 264/61 |
| 4,027,209 | 5/1977 | Maher | 361/361 |
| 4,135,224 | 1/1979 | Maher | 361/321 |
| 4,219,866 | 8/1980 | Maher | 361/321 |
| 4,266,265 | 5/1981 | Maher | 361/321 |
| 4,283,753 | 8/1981 | Burn | 361/321 |
| 4,324,750 | 4/1982 | Maher | 264/61 |

Primary Examiner—Donald A. Griffin

[57] ABSTRACT

A ceramic capacitor has a lead lanthanum titanate zirconate dielectric body including less than 1 weight % of an intergranular phase of a borate flux. Cadmium and/or zinc borate fluxes are found to be superior providing both efficient sintering and efficient gettering of the free lead that escapes the PLZT crystals during sintering so that a post anneal step to drive out the residual semiconducting lead oxide after sintering is no longer required to obtain high breakdown voltages and good accelerated life test results.

10 Claims, 6 Drawing Figures

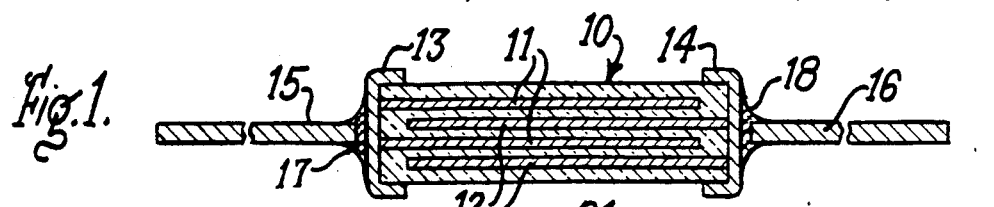
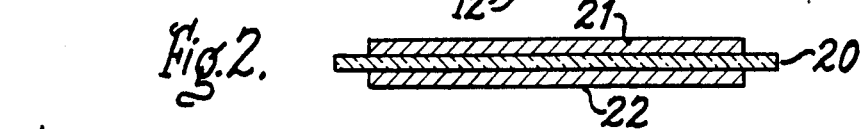
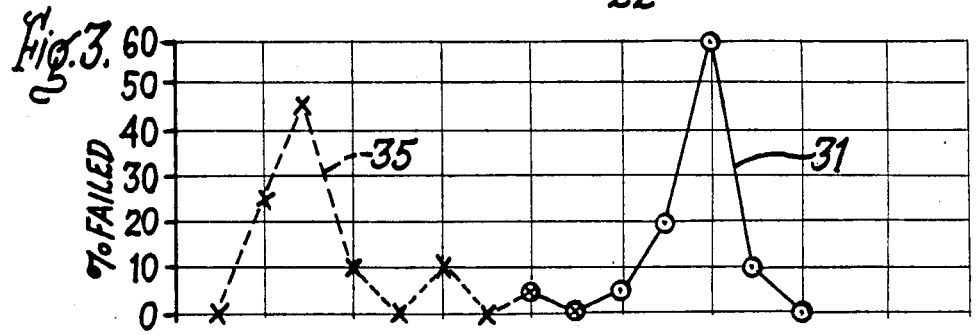
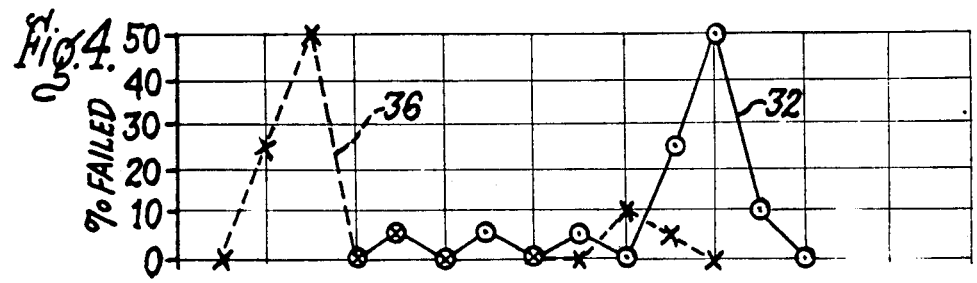
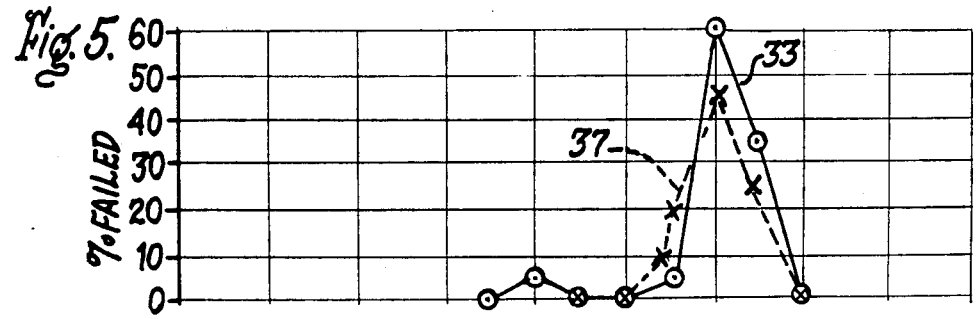
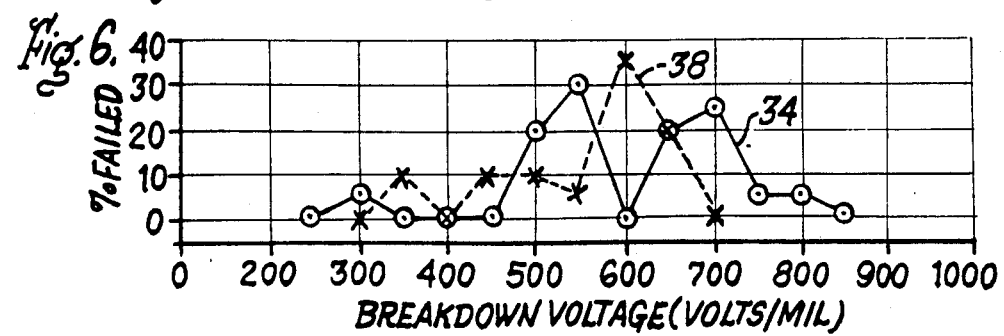

CAPACITOR WITH DIELECTRIC OF PLZT AND AN INTERGRANULAR BORATE

BACKGROUND OF THE INVENTION

This invention relates to a ceramic capacitor having a low temperature coefficient of capacitance and being comprised of a lead lanthanum zirconate titanate (PLZT) phase and a small intergranular cadmium- and/or zincborate phase having gettered lead that escaped from the PLZT phase during sintering.

The use of a glass sintering aid in PLZT dielectric ceramics is disclosed in each of my patents U.S. Pat. No. 4,027,209 issued May 31, 1977, U.S. Pat. No. 4,135,224 issued Jan. 16, 1979, U.S. Pat. No. 4,219,866 issued Aug. 26, 1980, and U.S. Pat. No. 4,324,750 issued Apr. 13, 1982 all of which are assigned to the same assignee as is the present invention. In the last of these it is noted that small amounts of the lead are volatilized and escape from the PLZT as lead oxide PbO during calcining and sintering, and that precipitation of semiconducting PbO at the grain boundaries seriously degrades capacitor performance.

The addition of glass sintering aids noted in U.S. Pat. No. 4,027,209 reduced this source of degradation but used alone it was far from an adequate solution to that problem as seen in U.S. Pat. No. 4,324,750 example 6. There the PLZT with 1.0 weight percent of a cadmium zinc borate silicate exhibited an unacceptable life test result. A post-sinter annealing step in an open atmosphere at about 950° C. for about an hour was executed to drive out the unwanted free lead oxide. That procedure produced a good life test result as in examples 7 and 8 of the later mentioned patent.

The annealing step is a solution to the free PbO problem but is accompanied by the disadvantage that the optimum anneal time and temperature must be determined for each formulation and is further a function of the surrounding PbO pressure at sintering and the quantity of ceramic being sintered in each closed crucible. In short, the anneal step is difficult to control.

It is therefore an object of this invention to provide a high quality PLZT dielectric ceramic formulation that does not require a post-sintering anneal.

SUMMARY OF THE INVENTION

A ceramic capacitor is comprised of a glass ceramic dielectric body and two spaced apart electrodes in contact with the body. The body is an antiferroelectric lead zirconate wherein from 0.07 to 0.16 molar parts of the lead are replaced with lanthanum and wherein from 0.10 to 0.40 molar parts of the zirconate are replaced by titanate, and a glass amounting to from 0.1 to 0.9 weight percent of the body. The glass consists of borates selected from cadmium borate, zinc borate and combinations thereof.

The lead borate had not been a part of the start glass used for making the glass-ceramic dielectric material, but was acquired during sintering. During sintering a portion of the lead in the ceramic PLZT phase is volatilized, and as is well known tends to precipitate as the semiconducting lead oxide PbO at the grain boundaries leading to low breakdown voltages and early failure at life test. Such capacitors are not reliable.

This invention recognizes that essentially pure cadmium borate or zinc borate or both, uniquely act as efficient getters of the unwanted free lead oxide during sintering. Zinc and cadmium glass compositions also serve as effective fluxes in a PLZT composition and they have a very small effect on the electrical properties of the PLZT.

In a PLZT, a cation from the glass that enters the grain on a large cation site will displace lead and exacerbate the free PbO problem, whereas cadmium and zinc do not appear to do so. The alkali earth metals are such lead displacing ions. On the other hand, when the glass phase includes the glass former element silicon, lanthanum is found to preferentially associate with the silicon in the glass creating a lanthanum silicate phase and thus changing the stoichiometry of the PLZT matrix. Therefore, a glass flux containing silicon is to be avoided. And advantageously the borates of cadmium and zinc each have a low melting temperature, relative to the silicates, which glass-melting temperature becomes even lower as the gettering of lead proceeds during sintering. Thus sintering the PLZT and borate flux of cadmium and/or zinc at about the conventional temperature of 1100° yields a PLZT body having densities near 97% of the theoretical maximum while essentially all of the free lead oxide is incorporated into the glass phase and the need for a post sinter annealing step is eliminated.

BRIEF DESCRIPTION OF THE DRAWING

FIG. 1 shows in side sectional view a monolithic ceramic capacitor of this invention.

FIG. 2 shows in side sectional view a ceramic chip of this invention.

FIGS. 3 through 6 each show a graph of the number of capacitors failing under an increasing voltage stress versus the voltage at which failure occurred. Only in FIG. 5 does the data represent capacitors of this invention.

DESCRIPTION OF THE PREFERRED EMBODIMENTS

The monolithic ceramic capacitor of FIG. 1 has a ceramic body 10. Film electrodes 11 are interleaved with film electrodes 12 all electrodes being buried in the body 10. Conductive termination coatings 13 and 14 contact electrodes 11 and 12, respectively. Lead wires 15 and 16 are attached by solder bonds 17 and 18 to terminations 13 and 14, respectively. Although the capacitor of FIG. 1 has three active ceramic dielectric layers, between adjacent and oppositely polarized electrodes, experimental monolithic capacitors to be described herein, have more active dielectric layers.

The chip capacitor of FIG. 2 has a ceramic body 20 and two film electrodes 21 and 22 on the opposite major surfaces of the body 20, respectively. Chip capacitors may have a rectangular or circular shape, and for high voltage uses may have a thickness equaling or exceeding the largest dimension of a major surface.

A brief description of the steps employed for making experimental capacitors is as follows:

A powder blend was prepared consisting by weight of 55.0 PbO, 5.70 $La_2O_3$, 3.40 BaO, 0.68 Ag(metal), 1.47 $Bi_2O_3$, 24.7 $ZrO_2$ and 9.0 $TiO_2$. The blend was ball milled and precalcined at 790° C. for 5 hours. The resulting cake was then granulated mechanically and calcined in a closed high purity aluminum sagger at 1090° C. for 3 hours. The calcined cake was crushed and jet pulverized to form a fine ceramic powder.

The above-noted start materials correspond to a compound $(Pb_{0.78}La_{0.11}Ba_{0.07}Bi_{0.02}Ag_{0.02})(Zr_{0.64}Ti_{0.36})O_3$ which compound is formed with lead vacancies at calcining and is structurally that of the grains in the subsequently sintered dielectric.

This material will sinter well without a low-melting sintering aid because lead oxide PbO escapes the PLZT at sintering, and PbO itself is molten above 890° C. and will promote liquid phase sintering. Thus the addition of a sintering aid or flux to a PLZT ceramic heretofore provides a source of cations that may be incorporated in the ceramic grains to effect desired changes in the temperature coefficient, and/or to moderate the detrimental presence of PbO at the grain boundaries after sintering. However, no additives have been known that essentially eliminate the residual free lead at the grain boundaries after sintering.

At this early point in the process 0.5 weight percent of a glass powder is added to the calcined and pulverized PLZT start powder. The different glass fluxes used in the following experimental examples are identified in Table I.

TABLE I

| Glass Flux | Compounds(s) |
| --- | --- |
| GF-1 | 25(PbO), 24($Bi_2O_3$), 36(CdO), ($Al_2O_3$), 4(ZnO), 5($B_2O_3$), 5($SiO_2$)* |
| GF-2 | 5 CdO.2 $SiO_2$ |
| GF-3 | BaO.$B_2O_3$ |
| GF-4 | 3ZnO.$B_2O_3$ |
| GF-5 | 3CdO.$B_2O_3$ |
| GF-6 | 68(3ZnO.$B_2O_3$) 32(3CdO $B_2O_3$)* |
| GF-7 | CdO.2ZnO.$B_2O_3$ |
| GF-8 | 43ZnO.21CdO.21$B_2O_3$.15$Al_2O_3$ |

*by weight %

In a series of experiments the relative merits of four glass compositions in a PLZT glass dielectric were explored. These glasses are identified in Table I as GF-1, GF-2, GF-7 and GF-3. To make these glasses the powder oxides of glass cations and alumina milling balls were mixed in acetone and milled in a polyethylene bottle for two hours. After drying, the balls were removed and the powder mixture was calcined at 550° C. to form the solid solution indicated in Table I for each case.

Four groups of experimental monolithic ceramic capacitors identified respectively as Examples 1, 2, 3 and 4 have PLZT ceramic bodies with 0.5 weight percent of the four glass powders respectively, GF-1, GF-2, GF-7 and GF-3.

The PLZT and glass powder mixture was stirred in an organic binder medium of essentially turpentine, 6% pine oil and 5% lecithin to produce a dispersion or slurry containing about 70% by weight of solids. This slurry was ball milled for about 10 hours.

Groups of experimental monolithic capacitors were produced by applying successive coatings of the above noted milled slurry to a substrate, drying each layer in turn and screen printing an electroding paste of 70% silver and 30% palladium particles onto each except the last of the dried layers of the dielectric material. Each layer is about 1 mil (0.025 mm) thick.

This assembly of dried layers with seven interleaved films of electroding paste was then diced into a multiplicity of square bodies and baked at 870° C. to remove the organic material. The electrodes were so arranged that after dicing, each body had the alternate of the electrodes extending to one cut end of the body and the other electrodes extend to the opposite cut end of the body as illustrated in FIG. 1. The body was subsequently sintered in a closed alumina crucible at a peak temperature of 1100° C. for 2½ hours. Closed container sintering is preferred with the container substantially filled with the bodies to be sintered, because this results in maintaining a positive atmosphere of lead oxide vapor leading to the retention during sintering of liquid lead oxide that acts as a sintering aid so that densification is achieved at a low sintering temperature. An open atmosphere sintering may result in a poorly sintered porous body and uncontrollable loss of lead from the PLZT body. In these experimental capacitors the active dielectric layer between adjacent buried electrodes is 1 mil (25 microns) thick.

Free lead at the grain boundaries was then removed by annealing the sintered bodies for 2½ hours at 950° C. in air. A silver paste was applied to the opposite ends of each sintered body and the body was heated to about 760° C. for 5 minutes to form cured terminals, e.g. 13 and 14 in FIG. 1.

The four groups of capacitors were subjected to an accelerated life test at 160VDC and 150° C. The number of failures experienced at 250 hours is shown in Table II.

TABLE II

| Example | Glass | # Failures/# Tested |
| --- | --- | --- |
| 1 | GF-1 | 1/10 |
| 2 | GF-2 | 9/9 |
| 3 | GF-7 | 0/10 |
| 4 | GF-3 | 3/8 |

These four procedures were repeated except for omitting the annealing step in Examples 5, 6, 7 and 8. A substantially worse failure rate was experienced except for the capacitors of Example 7 containing the cadmium zinc borate glass in which case there were again zero failures, as is indicated in Table III.

Other capacitors of Examples 1, 2, 3, 4, 5, 6, 7 and 8 were not subjected to the above-mentioned life test but were subjected to an increasing voltage at room temperature until each broke down. In FIGS. 3 through 6, breakdown voltage data (circles) for annealed capacitors in Examples 1, 2, 3 and 4 and comparative breakdown voltage data (crosses) for unannealed capacitors in Examples 5, 6, 7 and 8 are plotted in the fields defined by voltage breakdown versus number failed. In each graph data points are connected by a curve designated by the corresponding Example number plus 30.

Only in FIG. 5 curve 33 for annealed capacitors and curve 37 for unannealed capacitors, all having the cadmium zinc borate glass flux, are essentially indistinguishable. This series of tests is even more indicative of the superiority of the cadmium zinc borate glass in Examples 3 and 7.

This data strongly suggests that in this system, the barium glass of Examples 4 and 8 enters the PLZT crystal lattice on the large sites displacing even more lead and exacerbating the already serious free lead problem. It is also theorized that lanthanum is preferentially drawn to the silicon in the silica-containing glasses of Examples 1 and 5 and Examples 2 and 6, robbing the PLZT grains of lanthanum, and changing the PLZT lattice.

TABLE III

| Example | Glass Flux | Post Sinter Treatment | Life Test Results | Breakdown Voltage Results |
|---------|------------|-----------------------|-------------------|---------------------------|
| 1 | GF-1 | a | G | G |
| 2 | GF-2 | a | B | B |
| 3 | GF-7 | a | G | G |
| 4 | GF-3 | a | B | B |
| 5 | GF-1 | ua | B | B |
| 6 | GF-2 | ua | B | B |
| 7 | GF-7 | ua | G | G |
| 8 | GF-3 | ua | B | B |

Note:
a — annealed
ua — unannealed
G — good
B — bad

Neither cadmium nor zinc are believed to leave the glass to any significant extent at sintering and enter the PLZT grains, contrary to their behavior in barium titanate. This theory is consistent with the fact that there is no change in the lower Curie temperature as defined in the dielectric constant function plot versus temperature.

Considering this stability of cadmium and/or zinc, it is concluded that the glass forming element boron is what is needed to getter the free lead. However, boria or boric acid are not acceptable because both are hygroscopic. Hygroscopic materials are eschewed as causing too drastic a shrinkage as water is driven off in the early phases of heating and sintering the bodies.

Also, it has been observed that for additions of about 1.0 wt % and more of the borate flux, the PLZT formulation begins to exhibit a greatly reduced dielectric constant. Less than 0.9% of the borate flux is preferred while at least 0.1 weight percent is considered essential for PbO gettering.

In another series of experiments the effectiveness in the PLZT system of simple cadmium borate and zinc borate fluxes were compared with that of the above noted cadmium zinc borate. To a sample each of glasses GF-4, GF-5, GF-6 and GF-7 was added an equal weight of PbO. The mixture in each case was heated in a platinum dish to observe the temperatures at which they become substantially completely liquid. Table IV shows these results that are considered accurate to within about ±25° C.

TABLE IV

| Glass | Liquidous Pure | Liquidous with 50% PbO |
|-------|----------------|------------------------|
| GF-4 | 1090° C. | 725° C. |
| GF-5 | 1060° C. | 675° C. |
| GF-6 | 860° C. | 625° C. |
| GF-7 | 860° C. | 625° C. |

The melting temperature of PbO is 890° C. Thus, it is clear that all of these borates will create similarly eutectic compounds with fugitive PbO during the sintering of PLZT ceramics and result in similarly efficient liquid phase sintering.

Each of these four glasses was employed as the 0.5 weight percent flux with the PLZT ceramic. During the ramp up of temperature at sintering shrinkage of the fluxed PLZT bodies was measured by a dilatometer. The rate and ultimate degree of densification was almost identical for these borates of cadmium and zinc indicating essentially equal ability to getter free lead oxide and to aid sintering. In contrast, a PLZT body without any flux fired in an open air atmosphere does not sinter properly at 1100° C. It is partially porous due to the volatility of PbO and does not fully sinter. This demonstrates the importance of the free lead oxide as a sintering aid and puts in perspective the synergism between the cadmium and/or zinc borate flux leading to efficient sintering at a low 1100° C. and at the same time resulting in essentially no free lead oxide after sintering—without a post anneal step.

In yet another experiment, a comparison was obtained between the results using the excellent cadmium zinc borate, G-7, and the same glass with the addition of alumina, G-8. Again. monolithic PLZT ceramic capacitors were made by the same process used for making the capacitors of Examples 1, 2, 3 and 4. Again, 0.5 weight percent of the glass (G-8) was employed. The capacitors in this experiment exhibited a capacitance, dielectric constant, temperature coefficient of capacitance and dielectric breakdown characteristic that is essentially indistinguishable from those characteristic capacitor measures of the Examples 3 and 7 that include the G-7 glass.

During the sintering at 1100° C. in air of a PLZT body having no flux, from 1 to 1½ weight percent lead oxide is lost. This loss is normally anticipated and compensated for in advance by using a start composition that is lead rich. A flux should be chosen that will not cause a further loss of lead. Neither should the flux lure away elements in the PLZT grains nor add impurity atoms to the grains causing an imbalance in stoichiometry and/or charge balance in the grains.

Titania and zirconia as additives will getter free lead but will not reduce the sintering temperature and do not meet the above criteria for leaving the grains in balance. Also, even though the amount of flux is less than 1 weight %, the start flux compositon itself should contain less than about 2.0 weight percent of the oxides of the alkali metals Ba, Ca, Sr, and Cu and transition metals including Ni, Co, Fe and Mn. Furthermore, the flux should have less than 2.0 weight percent oxides of Sn, Sb, Nb, Ta and Bi, all of which additionally tend to enter the PLZT grains and have a substantial modifying effect on the Curie temperature of PLZT materials. Although Si does not enter the grains, $SiO_2$ for reasons noted above, should also amount to less than 2.0 weight percent of the flux.

The addition of substantial amounts of $Al_2O_3$ to the cadmium/zinc fluxes employed in this invention can actually result inan improved PbO gettering capacity although the comparative tests conducted and described here were not designed to show such superiority. This is consistent with the fact that alumina additions to glass compositions are known to act as an additonal glass former material, capable of expanding the quantities of cations that the glass composition can accomodate. It is judged that the flux of this invention may contain up to 20 weight percent alumina.

What is claimed is:

1. A ceramic capacitor comprising a sintered glass-ceramic dielectric body and two spaced apart electrodes in contact with said dielectric body, said body being composed of (A) an antiferroelectric lead zirconate phase wherein from 0.07 to 0.16 molar parts of said lead are replaced with lanthanum and wherein from 0.10 to 0.40 molar parts of said zirconate are replaced by titanate, and (B) a glass phase amounting to from 0.1 to 0.9 weight percent of said body, said glass phase consisting essentially of a borate selected from cadmium lead borate, cadmium aluminum lead borate, zinc lead borate, zinc aluminum lead borate and combinations thereof, said lead having been volatilized from said PLZT phase and gettered by said glass phase during sintering.

2. The ceramic capacitor of claim 1 wherein said borate is $CdO.2ZnO.xPbO.B_2O_3$.

3. The ceramic capacitor of claim 1 wherein said alumina in said borate amounts to no more than 20 weight percent.

4. The ceramic capacitor of claim 1 wherein said glass phase includes no more than 2 weight percent of the oxides of the elements Ba, Ca, Sr, Ni, Co, Fe, Mn, Sn, Sb, Nb, Ta, Bi and Si.

5. A method for making a ceramic capacitor comprising:
   (a) providing a powder of a PLZT ceramic essentially consisting of $$Pb_{1-x}La_x(Zr_yTi_{1-y})O_3$$

wherein x is from 0.07 to 0.16 and y is from 0.60 to 0.90;
   (b) providing a glass flux powder consisting essentially of a borate selected from cadmium aluminum borate, zinc borate, zinc aluminum borate and combinations thereof:
   (c) forming a mixture of said PLZT and glass flux powders wherein said flux amounts from 0.1 to 0.9 weight percent of said mixture:
   (d) forming a body of said powder mixture;
   (e) forming at least two spaced apart electrodes in contact with said body; and
   (f) firing said body to maturity at about 1100° C. to sinter said body to maturity and to cause said flux to getter the PbO that is volatilized from said PLZT.

6. The method of claim 5 wherein said firing of said body is accomplished in a closed crucible with a plurality of essentially identical PLZT bodies to provide a controlled PbO atmosphere about said bodies during said sintering.

7. The method of claim 5 wherein said glass flux is $CdO.2ZnO.B_2O_3$.

8. The method of claim 5 wherein said glass phase includes no more than 2 weight percent of the oxides of the elements Ba, Ca, Sr, Ni, Co, Fe, Mn, Sn, Sb, Nb, Ta, Bi and Si.

9. The method of claim 5 wherein about 2 mole percent of said lead is replaced by an equal molar amount of silver.

10. The method of claim 9 wherein about 2 mole percent of said lead is replaced by an equal amount of bisthmus.

* * * * *